United States Patent [19]
Allen

[11] Patent Number: 5,493,903
[45] Date of Patent: Feb. 27, 1996

[54] METHOD OF DETERMINING THE VOLUME OF A SUBSTANCE HAVING A DENSITY, IN VERTICAL STORAGE TANKS

[76] Inventor: James Allen, 11260 Hideaway Trail, Anchorage, Ak. 99516

[21] Appl. No.: 294,588

[22] Filed: Aug. 23, 1994

[51] Int. Cl.[6] .......................... G01F 17/00; G01F 23/00; G01L 9/04
[52] U.S. Cl. .................. 73/149; 73/720; 73/290 R; 73/49.2
[58] Field of Search ........................ 73/149, 49.2, 290 R, 73/720

[56] References Cited

U.S. PATENT DOCUMENTS

| | | | |
|---|---|---|---|
| 2,549,049 | 4/1951 | Bierman | 73/720 |
| 3,034,346 | 5/1962 | Starr | 73/765 |
| 3,358,501 | 12/1967 | Ormond | 73/765 |
| 4,213,348 | 7/1980 | Reinertson et al. | 73/765 |
| 4,777,497 | 10/1988 | Nozu et al. | 73/707 |
| 4,986,113 | 1/1991 | Harrison et al. | 73/49.2 |
| 5,259,673 | 11/1993 | Christopher | 73/149 |

FOREIGN PATENT DOCUMENTS

| | | | |
|---|---|---|---|
| 293629 | 12/1990 | Japan | 73/290 R |
| 118443 | 5/1991 | Japan | 73/149 |

*Primary Examiner*—Hezron E. Williams
*Assistant Examiner*—Daniel S. Larkin
*Attorney, Agent, or Firm*—Michael J. Tavell

[57] ABSTRACT

A method for determining the volume a substance having a density level in vertical storage tanks. This method uses a strain gauge that is attached to the exterior of the side wall of a tank. As the volume of the substance fluctuates in the tank, the walls are acted upon by the weight of the substance. The greater the volume of a substance, the greater the force pushing on the tank walls and vice-versa. This force causes the walls to deform slightly. This deformation can be measured by the strain gauge mounted on the tank wall. Because this deformation is directly related to the volume of the substance being stored in the tank, the deformation read by the strain gauge can be translated into its volume by calibrating the gauge measurements with known volumes in the tank.

16 Claims, 2 Drawing Sheets

METHOD OF DETERMINING THE VOLUME OF A SUBSTANCE HAVING A DENSITY, IN VERTICAL STORAGE TANKS

This invention relates to methods of determining the volume of liquids or solid having a density, being stored in vertical storage tanks and particularly to methods employing non-intrusive measuring using strain gauges.

BACKGROUND OF THE INVENTION

For centuries, people have used various types of casks, barrels and tanks for storing liquids or solids. Today, vertical storage tanks range in size from hundreds to millions of gallons. Determining the volume of a liquid or solid being stored in these tanks has been a major problem. The two common methods of determining level in a tank filled with a liquid are using floats within the tank, or "dipping" the tank, i.e., to insert a graduated stick or measuring tape into the tank and seeing where the liquid level falls on the graduations. Once the level is known, the volume can be calculated using mathematics. Although dipping tanks is a simple procedure, it is also dangerous. Often, the tanks being measured have slippery tops and no catwalks. Measuring tank levels with floats is safer, but relies on mechanical devices within the tank that require maintenance. Maintaining equipment within a tank poses its own set of problems in that the tank has to be drained and entered for repairs.

SUMMARY OF THE INVENTION

The present invention overcomes the problems cited above. It eliminates the need to go on top of the tank, or into the tank, to get a measurement of volume, thereby eliminating the biggest problem associated with tank volume measurement. The method uses a strain gauge that is attached to the exterior of the tank side wall. As the volume of liquid or solid within the tank fluctuates, the walls are acted upon by the weight of the liquid or solid. The greater the volume of liquid or solid, the greater the force pushing on the tank walls and vice-versa. This force causes the walls to deform slightly. This deformation can be measured by the strain gauge mounted on the tank wall. Because this deformation is directly related to the volume of the liquid or solid, the deformation read by the strain gauge can be translated into volume by either calibrating the gauge measurements with known volumes in the tank or by using the strain measurement and mathematics to calculate the volume. In the latter method, if the dimensions of the tank, the material that the tank is made of, the density of the liquid or solid, and the reduction in volume within the tank caused by any equipment installed within the tank, are known, this information can be used to calculate the volume of liquid or solid for any given strain measurement. This method lacks accuracy, however, because the dimensions of the tank are almost never uniform (i.e., most tanks are not truly round). Also temperature differences can change the dimensions on a given tank on a daily basis. In addition, tanks sometimes have equipment placed within them that reduces the available volume for storage. If this unusable volume is not subtracted, the result may overstate the volume of the liquid or solid.

It is an object of this invention to produce a method of determining the volume of liquid or solid being stored in vertical storage tanks that uses non-intrusive means for measurement.

It is another object of this invention to produce a method of determining the volume of liquid or solid being stored in vertical storage tanks that does not require access to the top of a tank.

It is yet another object of this invention to produce a method of determining the volume of liquid or solid being stored in tanks that is inherently mechanically fail-safe.

DETAILED DESCRIPTION OF THE INVENTION

Figure 1:
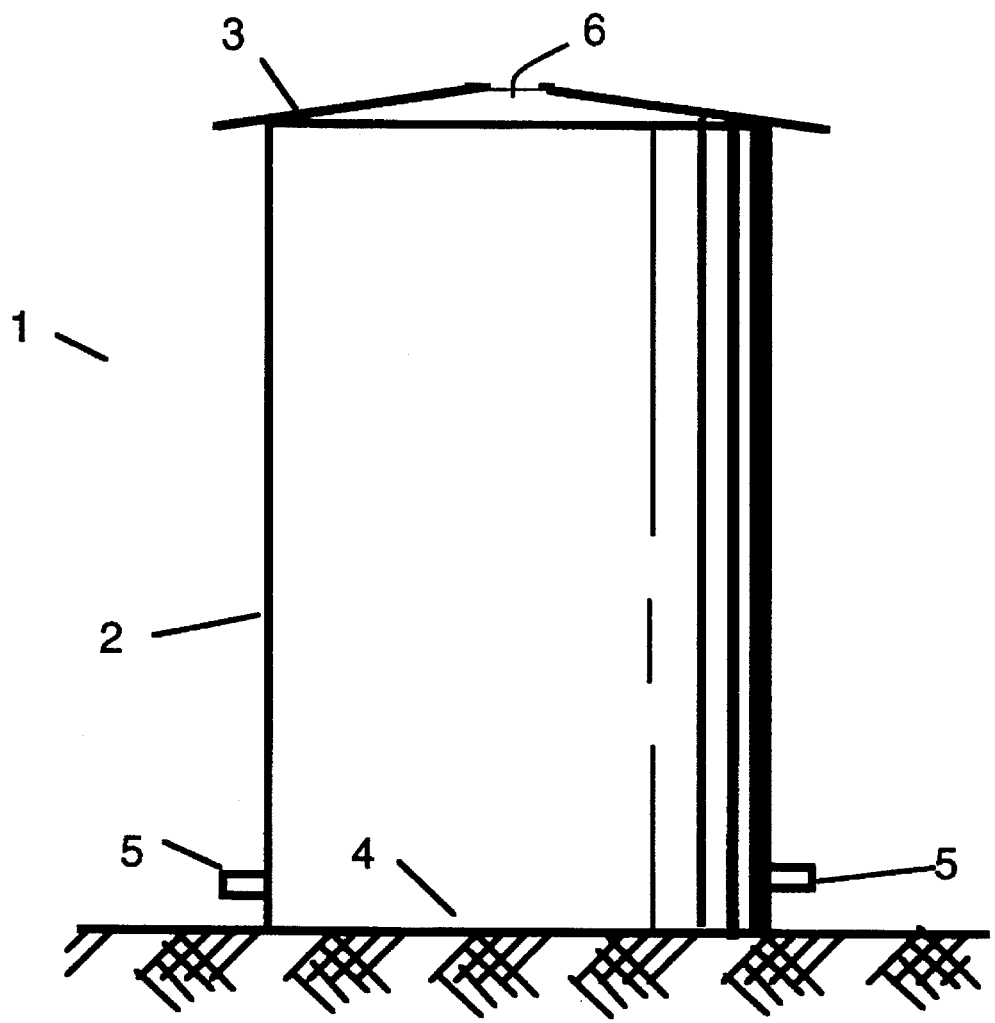
FIG. 1 is a side view of a typical vertical storage tank.

Referring now to the drawings, and particularly to FIG. 1, a typical vertical storage tank 1 is shown. These types of tanks usually have a cylindrical side wall 2 that can be a single-seamed cylinder of metal or other material, or can be produced from many segments that are field assembled. A typical tank 1 has a top 3 and a solid bottom 4, and one or more valves 5, typically located near the bottom of the tank 1. Note that not all tanks have tops, or valves. Moreover, simple conduits or pipes can be connected to the tank to allow the product stored within the tank to be removed or placed within the tank. The figures here illustrate the most common practice of having a tank with a top and with some type of valves. Moreover, use of the word "valve" throughout this specification and claims is for convenience only. The term "valve" should not be considered limited to merely some type of valve but encompasses any and all penetrations into the side wall 2 of a tank 1.

Figure 2:
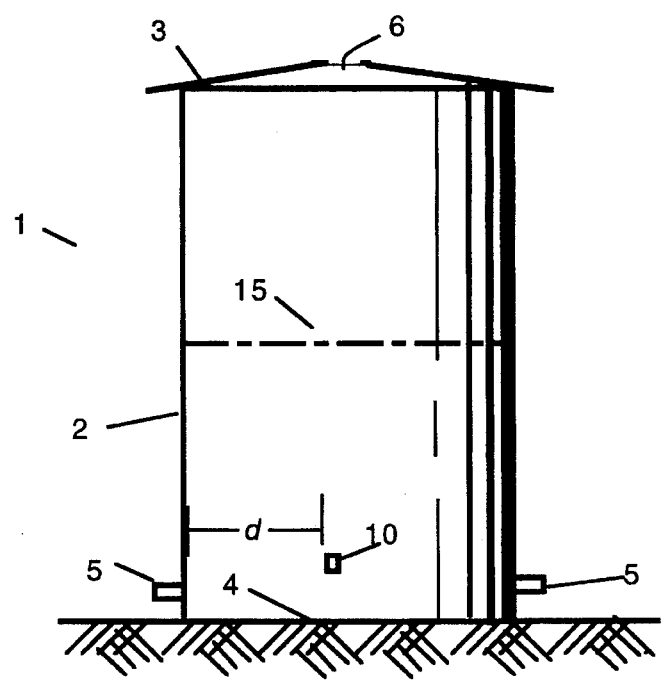
FIG. 2 is a side view of a section of a tank side wall showing the preferred placement of a strain gauge as used in this method.

The tank 1 normally holds a given quantity of liquid or solid 15 (see FIG. 2). One current practice of tank measurement uses a long measuring stick or a graduated tape, that is passed through an opening 6 at the top of the tank 1. The opening 6 typically is either a vent or a utility maintenance hole. Once the stick or tape is inserted into the tank 1, it is withdrawn and the level of liquid, for example, is determined using the graduations placed on the stick or tape. Once this level is known, standard mathematical formulas can be used to determine the volume of the liquid or solid within the tank 1, using the geometry of the tank 1. In practice, the results of these formulas have been produced in tabular form. Thus, for a given tank, a reading of 48 inches for example, can be checked on a table and the volume of liquid or solid for that depth can be read directly.

Dipping tanks is dangerous because it requires workers to climb to the top of tanks, an insert long measuring sticks, or tapes, into the tank. Under bad weather conditions, the procedure is more difficult or even impossible. Also, these workers may be exposed to harmful fumes, depending on the material being stored in the tank. Thus, most measurements of tanks using the stick method are infrequent.

The other principal method of measuring volume is from inside a tank using floats that rise and fall with the level of liquid in the tank. Although this procedure has many advantages, the equipment requires maintenance from time to time, which requires working on top of the tank or even possible entry into the tank for repairs.

Figure 3:
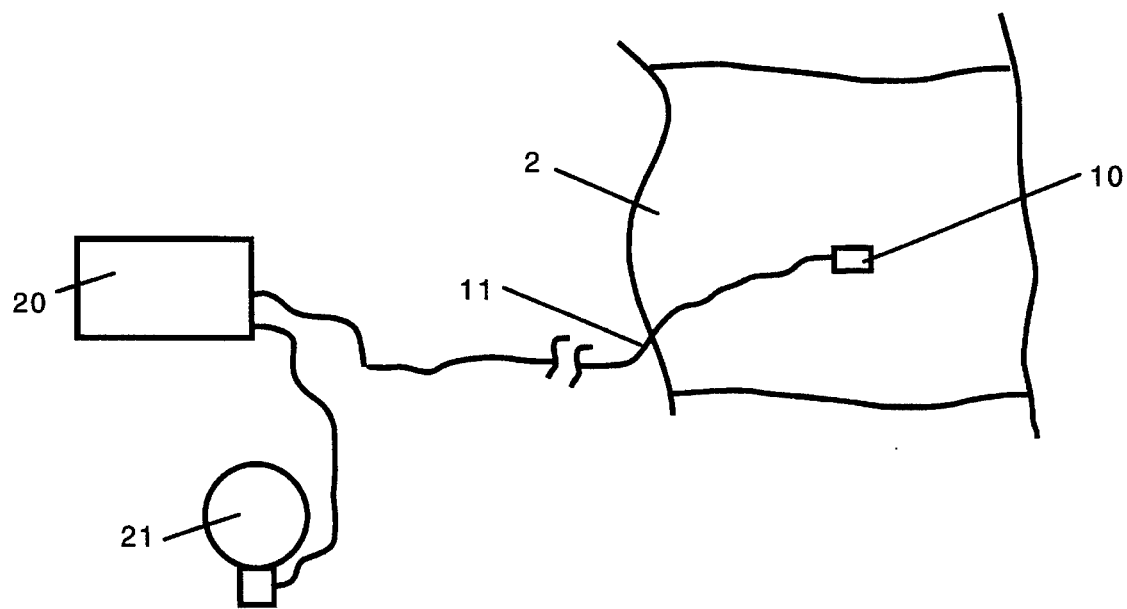
FIG. 3 is a detail view of the side wall showing the placement of the strain gauge on a tank and the associated monitoring devices.

The instant invention is a method that does not require climbing on or entering the tank to determine the volume of liquid or solid. The method has the following steps. First, a strain gauge 10 (see FIGS. 2 and 3) is attached to the side wall 2 of a tank 1. The strain gauge 10 can be any commercial type of strain gauge, although the preferred embodiment uses electronic type strain gauges. The strain gauge 10 is attached to the tank 1 using means normally suggested by the manufacturer. Once the strain gauge 10 is in place, it measures any deformation of the tank wall 2.

Where mechanical strain gauges are used, the strain can be measured from the gauge directly and translated by mathematics into a given level of liquid or solid (as discussed below) or can be compared to tabular values, previously work out for the given tank 1, to read the volume directly.

The preferred embodiment uses an electrical type strain gauge. An example of such a gauge is the OMEGA series of gauges sold by Omega Engineering, Inc., P.O. Box 4047, Stamford, Conn. 06906. These types of strain gauges are variable resistors that are connected into an electrical resistance bridging circuit, such as a Wheatstone bridge. Use of these gauges typically require additional equipment, such as amplifiers, signal conditioners, and if, desired, digitizing equipment. Such equipment must be specified for the type of strain gauge in use. It is beyond the scope of this invention to teach ordinary use of these types of strain gauges. These gauges should be installed according to the manufacture's directions, with the attendant appurtenances needed for monitoring and recording the data. Using electronic strain gauges is preferred because they can be electrically connected to computer monitoring equipment 20 (see FIG. 3), obviating the need to make visual on-site readings of the strain gauge. Thus, the electric strain gauge can be used to monitor remote tanks from one central location.

It is important for this invention to understand the preferred placement of the strain gauge 10 on a tank 1. The preferred placement of the strain gauge 10 is on the side wall 2 of a tank 1, at a height just above that of the valve 5 (where a valve is installed) The strain gauge 10 may be placed below the height of valve 5, but this is not preferred. Placed there, the strain gauge 10 may receive interference from the bottom 4 of the tank 1, or from equipment that is sometimes placed within the tank. Placement at a height above the valve 5 should eliminate this possible interference. Also, the strain gauge 10 should be placed away from the valve 5 at some distance d as shown in FIG. 2. The preferred spacing d of the strain gauge 10 is a minimum of three to ten feet from the valve 5, depending on the size of the tank 1. The preferred placement of the strain gauge prevents interference from the reinforcement plates used to support the valve 5. These reinforcement plates tend to show less strain than the side wall 2 of the tank 1 and as such, placement of the strain gauge 10 near the valve 5 may produce a false reading of level.

For the electronic model of strain gauges, the electrical resistance of the strain gauge 10 is in direct proportion to the deflection experienced by the tank wall 2. This deflection is a direct result of a liquid or solid 15 that is placed into the tank 1. The weight of the liquid or solid 15 presses against the tank floor 4 and walls 2 in a uniform force pattern. It is well known that if the circumferential strain of a thin wall vessel is uniform and the material is homogeneous, the circumferential stress is uniform.

The circumferential force is produced by the internal gage pressure only, and this pressure produces no shear stress along a longitudinal section of the vessel. This stress is commonly called "hoop" stress. Mathematically, the circumferential stress can be expressed as:

$$\sigma_c = \frac{pD_i}{2t}$$

Where $\sigma_c$ is the circumferential stress, p is the gage pressure, $D_i$ is the inside diameter of the vessel, and t is the wall thickness. This information was extracted from *Engineering Mechanics of Deformable Bodies*, Edward F. Byars and Robert D. Snyder, International Textbook Company, Scranton, Pa., 1963.

Because this force is uniform, the amount of deformation is directly proportional to the volume of liquid or solid in the tank. It is possible to calculate the volume of liquid or solid 15 based on the output of the strain gauge 10. As discussed above, many factors such as the density of the liquid or solid, the dimensions of the tank and the material the tank is made of, must be known to make the calculation. Because the dimensions of tanks are seldom precise, and change with the weather, this method does not produce precise volume measurements.

The volume of the liquid or solid within a tank is a function of the density of the liquid or solid, and the dimensions of the tank. Thus from the formula above, if the strain $\sigma_c$ is known, and the dimensions "$D_i$", and "t" are known, the equation can be solved for "p", the pressure. This pressure can be translated directly into volume if the density of the liquid or solid, expressed in units of pressure per unit volume, is known. Thus, if "p" is determined to be measured in pounds, and the density of the liquid or solid is known in units of pounds per cubic foot, the volume in cubic feet is then known. Standard conversion tables can then be used to convert cubic feet into barrels or gallons or any other unit of measure. Once the calculations have been done a table can be produced for any given tank 1. Then strain measurements can be taken at any given time and compared to the table to read the volume directly. The problem with this method is that it does not take variations in the dimensions of the tank, or volume reductions due to equipment in the tank, into consideration. Therefore, this method does not produce a precise measurement of the volume.

A more practical method is to calibrate the output of the strain gauge 10 to various volumes of liquids or solids 15 in the tank 1. This can be done by placing a known quantity of a liquid or solid 15 into the tank 1 (e.g., 10, 50, 100, 1000 gallons) and measuring the output of the strain gauge 10. Then an additional known quantity of liquid or solid 15 can be added and a second measurement from the strain gauge 10 can be taken. This process can be repeated until the tank 1 is full. The readings thus obtained can be then used to create a scale for measuring the level of liquid or solid 15 in the tank 1 in the future. This scale can be developed using any measurement units, e.g., inches, centimeters, or liters.

A second method involves placing a known level of a liquid or solid 15, i.e., 1 inch or more, then measuring the output of the strain gauge 10. After this measurement is made, additional liquids or solids 15 can be added as in the first method, measuring the output of the strain gauge 10 at each interval until the tank 1 is full.

In this way, the output readings from the strain gauge 10 can be translated directly into volume levels. Using a cable 11, or other electric transmission means this information can be placed into computer 20 or other tracking system and can provide real time volume levels for any tank. This method thus provides almost continuous monitoring of tank levels without the need to dip the tanks using the stick or tape method.

Recalibration is needed when a new liquid or solid 15, having a different density, is stored in the tank 1. Once calibrated for the new liquid or solid 15, however, the gauge can be used by using the appropriate scale for that liquid or solid 15 as determined by the calibration process.

This method also can be used to signal a leak or rupture of the tank 1, when used in a continuous monitoring mode, as a sudden loss of the stored liquid or solid 15 produces a resultant instantaneous change in the output of the strain gauge 10. This change in output can be used to trigger an alarm or other warning device 21. The system also can be programed with high and low level alarms so that the tank 1 can be automatically filled if the low level is reached. The filing process can be stopped when a high level reading is reached.

The present disclosure should not be construed in any limited sense other than that limited by the scope of the claims having regard to the teachings herein and the prior art being apparent with the preferred form of the invention disclosed herein and which reveals details of structure of a preferred form necessary for a better understanding of the invention and may be subject to change by skilled persons within the scope of the invention without departing from the concept thereof.

I claim:

1. A method of determining a volume of a substance, having a density, in a vertical storage tank having, a bottom, a valve, being positioned at a height above ground level, and a side wall, forming a vessel with dimensions of height, width and volume, comprising the steps of:
   a) fastening a strain gauge to the side wall of said vertical storage tank at a height above the valve;
   b) obtaining strain measurements from said strain gauge; and
   c) determining the volume of said substance having a density in the vertical storage tank by applying the strain gauge measurement to a mathematical formula wherein the volume of said substance having a density is a function of the density of the substance, the strain measured on the side wall of said vertical storage tank, and the dimensions of the vertical storage tank.

2. The method of claim 1 wherein the strain gauge is placed horizontally at a distance of between three to ten feet away from said valve.

3. The method of claim 1 wherein said strain gauge has a variable electrical resistance such that said strain measurements are in proportion to the variable electrical resistance of said strain gauge, said variable electrical resistance of said strain gauge further being variable in proportion to a stress perceived by said strain gauge on said side wall of said vertical storage tank.

4. The method of claim 3 wherein said variable electrical resistance is connected to, and made part of, an electrical resistance bridge.

5. A method of determining a volume of a substance having a density, in a vertical storage tank having, a bottom a valve, being positioned at a height above ground level, and a side wall, forming a vessel with dimensions of height, width and volume, comprising the steps of:
   a) fastening a strain gauge to the side wall of said vertical storage tank at a height above the valve;
   b) obtaining strain measurements from said strain gauge; and
   c) transmitting said strain measurements from said strain gauge to a means for monitoring said strain measurements.

6. The method of claim 5 wherein the strain gauge is placed horizontally at a distance of between three to ten feet away from said valve.

7. The method of claim 5 wherein said strain gauge has a variable electrical resistance such that said strain measurements are a in proportion to the variable electrical resistance of said strain gauge, said variable electrical resistance of said strain gauge further being variable in proportion to a stress perceived by said strain gauge on said side wall of said vertical storage tank.

8. The method of claim 7 wherein said variable electrical resistance is connected to, and made part of, an electrical resistance bridge.

9. The method of claim 5 wherein said means for monitoring said strain measurements of said strain gauge, are calibrated.

10. A method of determining a volume of a substance having a density, in a vertical storage tank having, a bottom, and a side wall, forming a vessel with dimensions of height, width and volume, comprising the steps of:
    a) fastening a strain gauge to the side wall of said vertical storage tank;
    b) obtaining strain measurements from said strain gauge;
    c) transmitting said strain measurements from said strain gauge to a means for monitoring said strain measurements; and
    d) calibrating said means for monitoring said strain measurements by:
       a) filling the vertical storage tank with a measured quantity of the substance having a density, thereby establishing a first level of the substance having a density;
       b) measuring the strain measurements of said strain gauge;
       c) correlating said strain measurements of said strain gauge to the measured quantity of the substance having a density;
       d) adding an additional measured quantity of the substance having a density, thereby establishing a second level of the substance having a density;
       e) correlating said measurements of said strain gauge to the additional measured quantity of the substance having a density; and
       f) repeating steps (d) and (e), raising the level of the substance having a density by a successive increment in each step, until said vertical storage tank is full.

11. The method of claim 10 wherein said measured quantity of the substance having a density is such that the level of the substance having a density in the vertical storage tank is raised a unit of volumetric measure in each step.

12. The method of claim 11 wherein said unit of volumetric measure is inches.

13. The method of claim 11 wherein said unit of volumetric measure is gallons.

14. The method of claim 11 wherein said unit of volumetric measure is centimeters.

15. The method of claim 11 wherein said unit of volumetric measure is liters.

16. The method of claim 11 wherein said unit of volumetric measure is barrels.

* * * * *